April 29, 1952     M. L. NICHOLS     2,594,673
FISHING LURE
Filed Nov. 6, 1947
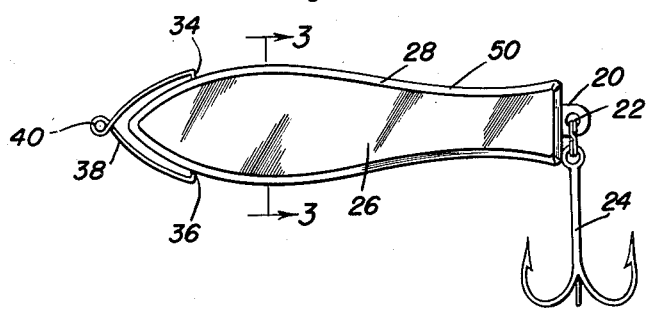
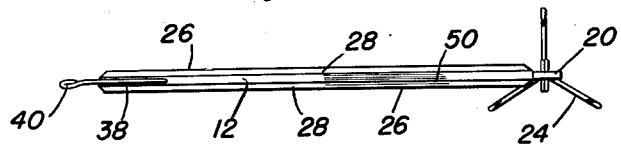
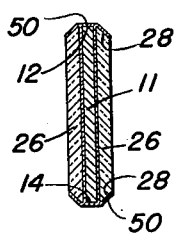
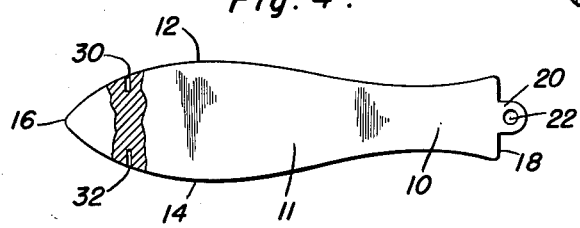
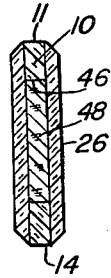
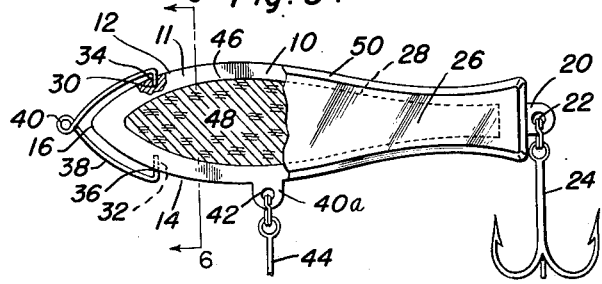
Mary L. Nichols
INVENTOR.
BY Clarence A. O'Brien
and Harvey B. Jacobson
Attorneys Patented Apr. 29, 1952

2,594,673

UNITED STATES PATENT OFFICE 2,594,673

FISHING LURE

Mary L. Nichols, Santa Ana, Calif., assignor to John T. Nichols, Santa Ana, Calif.

Application November 6, 1947, Serial No. 784,377

1 Claim. (Cl. 43—42.33)

This invention relates to new and useful improvements in fishing lures and the primary object of the present invention is to provide a lure including novel and improved light reflecting means that are so designed as to attract fish and the like thereto.

Another important object of the present invention is the provision of a fishing lure including oppositely disposed mirrors having beveled edges that will tend to reflect and refract the incident light in a plurality of directions simultaneously.

A further object of the present invention is to provide a reflecting fishing lure that is so designed as to permit great stresses upon the bridle thereof without effecting a shearing of the bridle from the lure body.

A still further aim of the present invention is to provide a fishing lure of the aforementioned character that is simple and practical in construction, strong, and reliable in use, neat and attractive in appearance, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a side elevational view of the present fishing lure;

Figure 2 is a top plan view of Figure 1;

Figure 3 is an enlarged transverse vertical sectional view taken substantially on the plane of section line 3—3 of Figure 1;

Figure 4 is a side elevational view of the core or body member used in conjunction with the present invention, and with parts thereof broken away and shown in section;

Figure 5 is a side elevational view of the present lure in slightly modified form, and with parts broken away and shown in section; and Figure 6 is an enlarged transverse vertical sectional view taken substantially on the plane of section line 6—6 of Figure 5.

Referring now to the drawings in detail, wherein for the purpose of illustration, there is disclosed a preferred embodiment of the present invention, the numeral 10 represents a flat piece of suitable metal forming the body or core portion of the present invention that is non-corrosive in fresh or salt water. This body 10 is provided with a head portion 11 having forwardly converging arcuate side edges 12 and 14, that terminate in a forward point 16. The rear edge 18 of the body is relatively straight and is integrally formed with a rear ear 20 having an aperture 22 that engages a suitable gang of hooks 24.

Fixedly secured to the respective outer faces of the body 10, is a pair of reflectors or mirrors 26 that conform to the curvature of the body portion 10. The edges 28 of these mirrors 26 are beveled, so that the mirrors will function as prisms to reflect and refract the incident light in a plurality of directions at the same time, thus initially attracting fish thereto.

Apertures or sockets 30 and 32 are provided in the edges 12 and 14 and engage the inturned ends 34 and 36 of a substantially V-shaped stainless steel and rust-proof bridle 38 having a loop or eye 40 formed at its forward outer extremity for engaging a suitable line (not shown). It should be noted that the eye 40 aligns the longitudinal axis of the body 10, so that when pressure is applied in pulling the lure through a fluid medium, the ends of the bridle will be equally stressed in the sockets 32 and 34 to prevent shearing off of the ends. Obviously, the bridle can be adjusted to cause the lure to travel back and forth crosswise while the lure is used in trolling.

Reference is now directed to Figure 5, wherein there is disclosed the present lure in slightly modified form. In this embodiment, the elements are similar to that embodiment previously described, however, a further supporting ear 40 is integrally formed with the body at its edge 14 and is provided with an aperture 42 that engages a further gang of hooks 44. Also, the central portion of the body 10 is provided with a central opening 46 conforming to the shape of the outside edges of the body, and a buoyant element such as a cork 48 is frictionally positioned in the opening 46 and its faces are co-planar with the faces of the body.

It should be noted that the beveled edges of the mirrors 28 and the outer edges of the body 10 are coated with a suitable glue or transparent waterproof lacquer 50 so that water may not enter between the mirrors and the body to cause a separation of the same, but which will still permit brilliant light rays to be reflected from the edges 28.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

Having described the invention, what is claimed as new is:

An artificial lure comprising a body formed of a flat piece of metal and including a head portion having forwardly converging arcuate side edges, mirrors rigidly secured on opposite sides of said body and conforming to the shape of said body, hook engaging means integrally formed with said body, a bridle pivotally carried by said head portion, and means sealing the edges of said body to the edges of said mirror, said body including a central opening, and a flat buoyant element fitting in said central opening.

MARY L. NICHOLS.

REFERENCES CITED

The following references are of record in the file of this patent:

UNITED STATES PATENTS

| Number | Name | Date |
| --- | --- | --- |
| 1,180,753 | Zeigler | Apr. 25, 1916 |
| 1,209,022 | Phinney | Dec. 19, 1916 |
| 1,233,507 | Reynolds | July 17, 1917 |
| 1,323,458 | Dills | Dec. 2, 1919 |
| 1,955,408 | Chapleau et al. | Apr. 17, 1934 |
| 2,163,666 | Carter et al. | June 27, 1939 |
| 2,483,245 | Steinhart | Sept. 27, 1949 |

FOREIGN PATENTS

| Number | Country | Date |
| --- | --- | --- |
| 47,415 | Sweden | July 21, 1920 |
| 281,100 | Great Britain | Dec. 1, 1927 |
| 651,252 | France | Feb. 16, 1929 |
| 758,082 | France | Jan. 10, 1934 |